United States Patent [19]

Brummet

[11] Patent Number: 4,625,601

[45] Date of Patent: Dec. 2, 1986

[54] PIPE LATHE

[75] Inventor: William N. Brummet, Burbank, Calif.

[73] Assignee: Pilot Manufacturing Company, Ashtabula, Ohio

[21] Appl. No.: 641,135

[22] Filed: Aug. 15, 1984

[51] Int. Cl.⁴ .............................................. B23B 5/16
[52] U.S. Cl. ..................................... 82/4 C; 144/205; 82/4 R
[58] Field of Search ................... 82/4 C, 4 R; 144/205

[56] References Cited

U.S. PATENT DOCUMENTS

| | | | |
|---|---|---|---|
| 2,537,916 | 1/1951 | Rosenboom | 82/4 R |
| 3,540,329 | 11/1970 | Gill | 144/205 |
| 3,813,968 | 6/1974 | Thomas | 82/4 C |
| 4,343,207 | 8/1982 | Paysinger | 82/4 R |

*Primary Examiner*—Leonidas Vlachos
*Attorney, Agent, or Firm*—Nilsson, Robbins, Dalgarn, Berliner, Carson & Wurst

[57] ABSTRACT

A pipe lathe is disclosed for performing work on the end of a pipe. An arbor assembly having an arbor shaft is inserted in the end of the pipe. A hub having a frame is positioned on the arbor. An arm from the frame carries a cutter holder. The arm projects over the end of the pipe to position a single point cutter for cutting the outer surface of the pipe. Spiral threads coupled to the arbor shaft engage spiral threads on the hub to move the hub and frame toward or away from the pipe end when the hub is rotated to provide automatic longitudinal progression of the cutter along the outer pipe surface as the hub rotates. Automatic radial progression of the cutter toward or away from the center of the pipe is provided by two sprockets, a chain between the sprockets, and gearing on the cutter holder. One sprocket is located on the arbor shaft and does not rotate in relation to the arbor shaft. The other sprocket is located on the frame. As the hub and frame rotate, the non-rotating sprocket induces rotation in the frame sprocket directly related to the rotation of the hub on the arbor shaft. The rotation of the frame sprocket is transmitted to the cutter holder through suitable gearing to automatically move the cutter radially. A combination of the automatic radial progression and the automatic longitudinal progression of the narrow cutter produces a taper on the end of the pipe.

14 Claims, 6 Drawing Figures

PIPE LATHE

BACKGROUND AND SUMMARY OF THE INVENTION

This invention relates to the pipe lathe art, and more particularly to a pipe lathe which mounts on the pipe for conducting work on the pipe.

Pipes are fabricated of numerous different materials including metal, cement, and plastic. The present invention primarily concerns portable pipe lathes for fiber glass reinforced plastic pipe ranging in diameter from approximately 50 mm. in diameter to 1500 mm. in diameter.

The installation and laying of pipe may require the cutting of pipe lengths and preparation of the pipe ends prior to the fitting of the pipes together. The pipe is prepared in the factory with standard lengths cut or molded and the ends threaded, tapered, shaved, or ground as needed. However, the same procedures need to be available in the field to fit standard lengths of pipe into special situations, to remove oxidation and other impurities prior to assembly, to salvage partially damaged lengths, and to prepare non-standard lengths when required.

The plastic in the fiber glass reinforced plastic pipe reacts with the atmosphere and is changed by exposure to sunlight after fabrication. In order to assure satisfactory bonding between adjacent lengths of pipe or between a length of pipe and a coupling, the outer surface of the pipe near the end must be prepared prior to assembly. Several methods of surface preparation are available including the use of solvents, sanding, grinding, and scraping.

One joint is called the butt and wrap. The ends of the two pipes to be joined are ground or scraped to taper the ends and prepare the outer surface for bonding. The ends are then butted against each other and resin saturated glass reinforced cloth is wrapped around the joint.

Another joint is the bell and spigot. The end of one pipe is flared into a slight bell during fabrication. The end of the pipe to be joined to the bell is prepared in the manner described for the preparation of the ends for the butt and wrap joint. The taper of the spigot end must be the same as the taper inside the bell in order to achieve a satisfactory joint. The spigot may be tapered at the factory during fabrication or made to fit in the field. Prior to assembly, the ends are cleaned with a solvent or by light sanding. Bonding material is then applied to both ends and the spigot is inserted into the bell.

Molded couplings and fittings are also available for assembly and come in a variety of shapes and sizes. Many have bell shaped tapered openings. The preparation of the pipe end to be inserted into a bell shaped opening is identical to the preparation of any tapered spigot.

Threads may also be used for assembly. For example, the inside of a bell coupling on the end of a pipe may be threaded to match a threaded spigot on the end of another pipe.

Tapering tools have been developed for use in the field. One type is the scraper. A mandrel is inserted into the end of the pipe after it is cut to length. Each size of pipe has a different mandrel. A frame having an arm with a tool holder is fitted onto the mandrel. The tool holder is set at the desired taper angle. A scraping blade, similar to a large razor blade, is fitted into the tool holder with the blade in a plane perpendicular to the outside of the pipe in the longitudinal direction and with the blade cutting edge at the desired taper angle. The frame is then rotated either by hand or with the aid of an electric or pneumatic motor. The taper produced is determined by the set of the blade in the tool holder.

Another method of making the taper is by grinding. A grinding wheel set at the desired taper angle and powered by an electric or pneumatic motor is substituted for the tapering blade. The grinder tends to be faster than the blade but is costly, ackward, and introduces the problem of dust. The large size of the grinder may also be a problem when pipe end preparation is required in close quarters. The most basic grinding method omits the mandrel and requires the operator to manually and visually judge a proper grind depth and angle as the grinder is moved about the outside of the end of the pipe.

Single point contact cutters, similar to tools found on bench lathes, have been successfully utilized in field pipe lathes which provide for automatic longitudinal progression of the cutters along the pipe as the cutters are rotated around the pipe. Most have been developed for work on asbestos-cement pipe. Pilot Manufacturing Company in Torrance, Calif. makes several sizes of longitudinally feeding field pipe lathes utilizing single point contact cutters. The automatic longitudinal feed is achieved by providing spiral threads coupled to an arbor shaft positioned inside the pipe and engaging spiral threads on a hub carrying the cutter. As the hub rotates, the hub is screwed along the arbor shaft by the threads causing the automatic longitudinal progression of the cutter down the outer surface of the pipe. The depth of cut is not varied during the progression. If a shallow cut is needed, a single machining pass may be sufficient. If a deeper cut is desired, additional machining passes may be required. The advantage of the single point cutter is that all of the cutting force is concentrated on a narrow point requiring less power to turn the cutter than the wide scraping blades discussed above. Also, a point support may be used inside the pipe rather than the larger area mandrel support required with scraping blades.

The present invention combines an automatically progressing longitudinal feed with an automatically progressing radial feed allowing a single point contact cutter to be utilized to automatically produce a tapered end. Disengagement of the radial feed allows the lathe to produce a straight tenon cut. Disengagement of the longitudinal feed allows the lathe to make a groove or cut off the end entirely depending upon the depth of the cut.

The longitudinal feed is achieved as described above by spiral threads coupled to an arbor shaft engaging spiral threads on the hub. The radial feed is achieved by providing two sprockets, a chain between the sprockets, shafting, and gearing on the cutter holder. One sprocket is located on the arbor shaft and does not rotate in relation to the arbor shaft. The other sprocket is located on the frame. As the hub and frame rotate, the non-rotating sprocket induces rotation in the frame sprocket directly related to the rotation of the hub on the arbor. The rotation of the frame sprocket is transmitted to the cutter holder through suitable gearing to automatically move the cutter radially. The combination of the automatic radial and longitudinal progressions of the cutter produces a taper on the end of the pipe.

As the advantages of fiber glass reinforced pipe have become increasingly recognized, the potential demand for an automatically tapering field pipe lathe has grown. The present invention makes possible the automatic cutting of precision tapers at any desired angle by changing one or two sprockets. The present invention is also adjustable to fit any diameter pipe and to make straight tenon cuts, grooves, and cut offs. The lathe is able to operate on pipes having walls with variable initial thicknesses and ones that are flexed out of round, since the cutting is between the cutter on the outside of the pipe and a wheel or roller riding on the inside of the wall, instead of the distance between the cutter and the arbor or mandrel as found in other lathes.

Other features and advantages of the present invention will become apparent from the following detailed description, taken in conjunction with the accompanying drawings, which illustrate, by way of example, the principles of the invention.

BRIEF DESCRIPTION OF THE DRAWINGS

In the drawings, which constitute a part of this specification, an exemplary embodiment demonstrating the various objectives and features hereof is set forth as follows.

DESCRIPTION OF THE ILLUSTRATIVE EMBODIMENT

As indicated above, a detailed illustrative embodiment of the invention is disclosed herein. However, other embodiments may be constructed some of which may be rather different from the disclosed illustrative embodiment. Consequently, the specific structural and functional details disclosed herein are merely representative, yet in that regard are deemed to provide the best embodiment for purposes of disclosure and to provide a basis for the claims herein.

Figure 1:
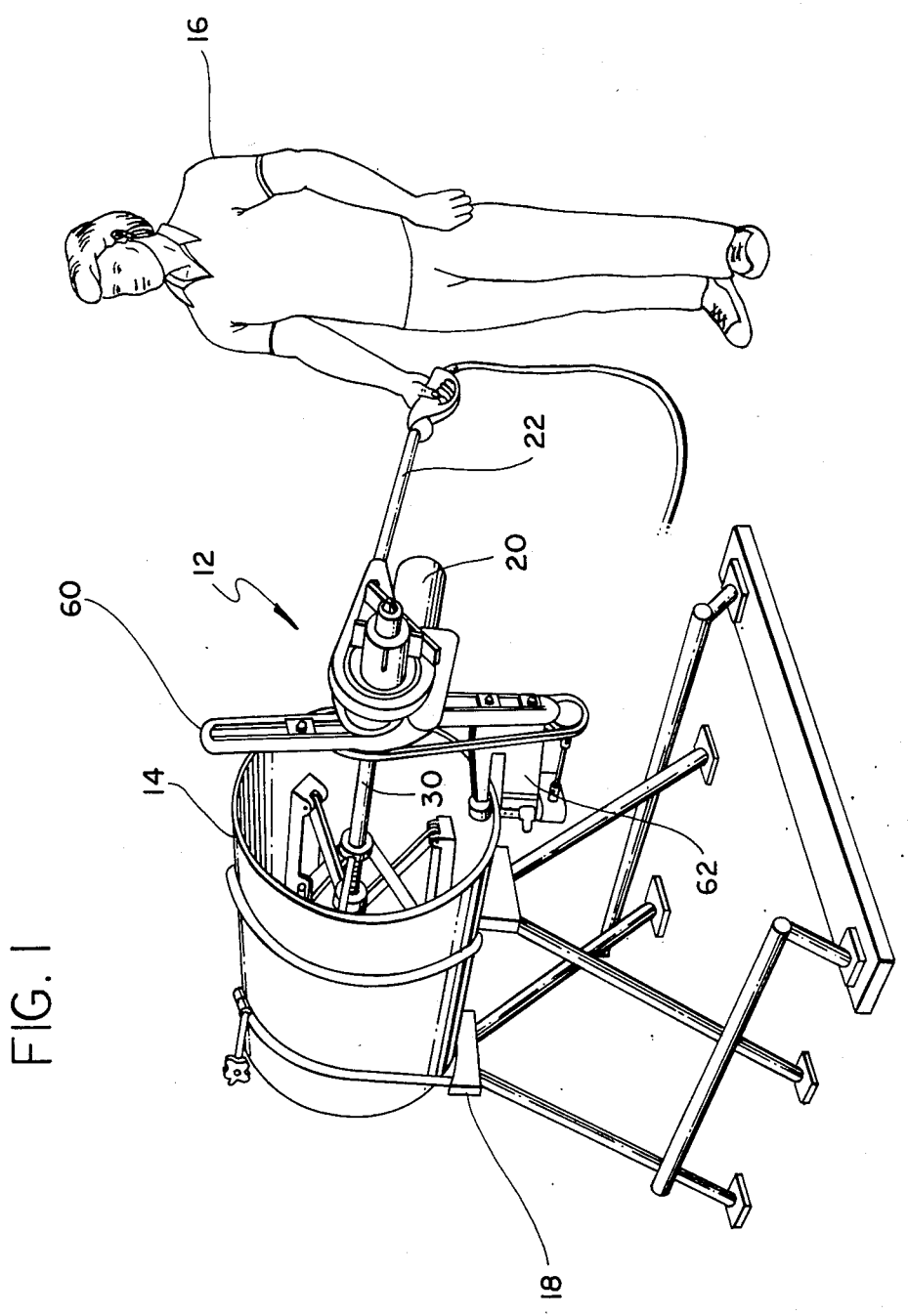
FIG. 1 is a perspective view of a pipe lathe mounted on a pipe secured by a pipe vise and operated by a worker in accordance with the present invention.

Referring initially to FIG. 1, a pipe lathe, generally designated 12, is mounted on a pipe 14 and operated by a worker 16. The pipe 14 is mounted in a pipe vise 18. As shown, the power drive 20 rotating the lathe 12 is electric. Similarly shaped pneumatic power drives may also be used. Both types are widely available in the plumbing industry for turning pipe tools. Alternatively, the lathe 12 may be turned by a ratcheting hand lever. Hand levers are often used where neither electricity nor compressed air are available such as at remote sites and where unusual physical conditions or hazardous environments make power drives dangerous. The position of the worker 16 during the operation of the lathe 12 is as represented in FIG. 1. Little force is required by the worker 16 on the handle 22 of the power drive 20 to control or resist the cutting action of the lathe 12 because the handle 22 is long providing good leverage.

Figure 2:
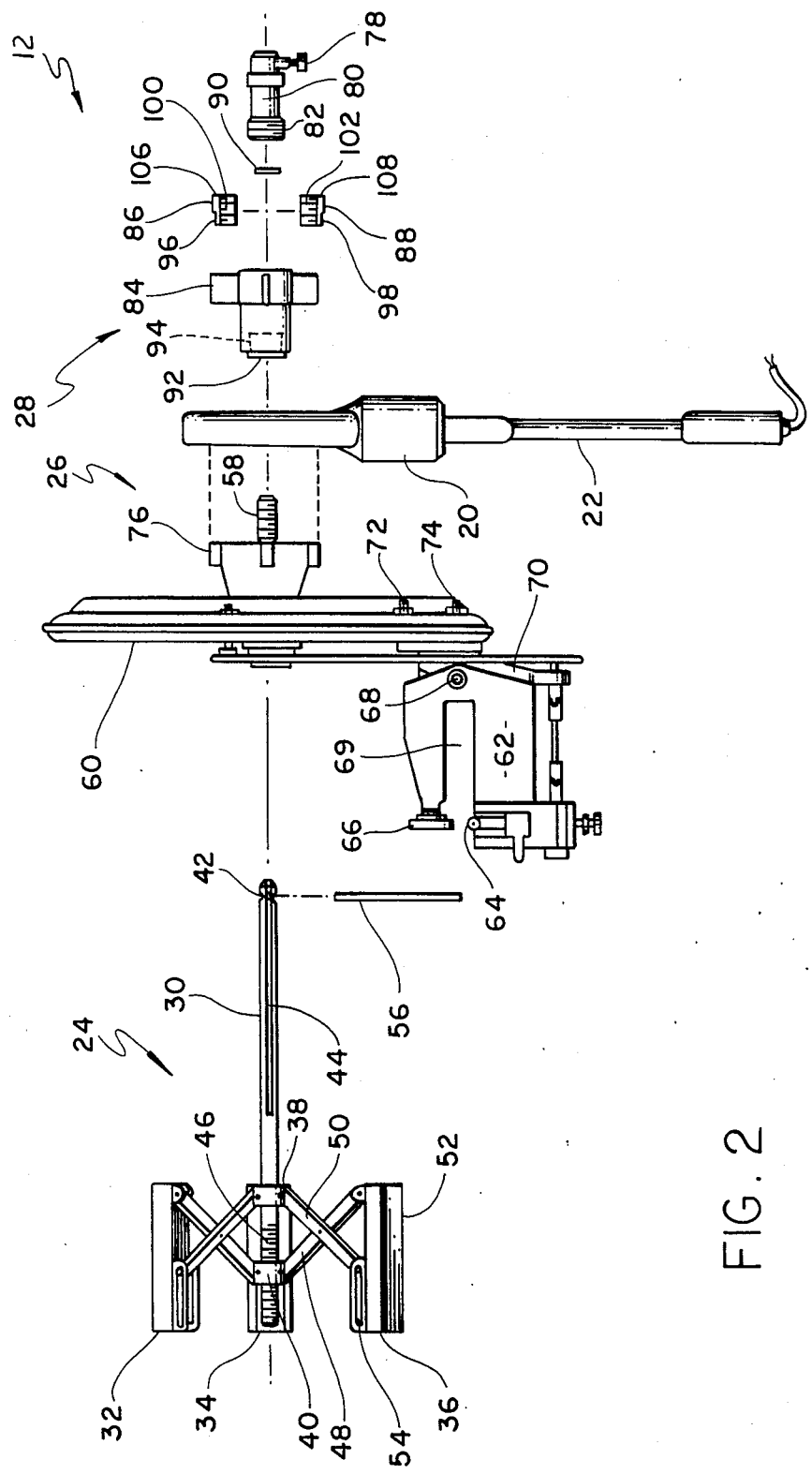
FIG. 2 is an enlarged exploded view of the pipe lathe of FIG. 1.

FIG. 2 is an exploded view of the major components of the pipe lathe 12 with a power drive 20. The pipe lathe 12 includes an arbor assembly 24, a frame assembly 26, and a screw feed assembly 28. The purpose of the arbor assembly 24 is to provide a mounting means for the frame assembly 26 in the center of the pipe 14 by locating an arbor shaft 30 substantially in the center of the pipe 14. The adjustability of the arbor assembly 24 allows it to be used with pipes having varying diameters. The arbor assembly 24 includes the arbor shaft 30; three finger assemblies 32, 34, and 36; a thrust bearing 38; and a threaded bearing 40. The arbor shaft 30 has a locking pin hole 42, a slot 44, and a spiral threaded portion 46. Each of the finger assemblies 32, 34, and 36 has a fixed scissors finger 48, two sliding outer scissors fingers 50, a pad 52, and finger slots 54. Installation of the arbor assembly 24 into the pipe 14 is achieved by inserting the assembly 24 into the pipe 14, holding the thrust bearing 38 with a hand to prevent rotation of the finger assemblies 32, 34, and 36 when the arbor shaft 30 is rotated, and rotating the arbor shaft 30 with the other hand to screw the threaded bearing 40 down the spiral threaded portion 46 to expand the finger assemblies 32, 34, and 36 until the finger pads 52 on each finger assembly 32, 34, and 36 touch the inner wall of the pipe 14. A rod 56 or screwdriver is then inserted into the locking pin hole 42 to provide a lever to further screw the arbor shaft 30 and expand the finger assemblies 32, 34, and 36 against the inner wall of the pipe 14 to secure the arbor assembly 24 in the pipe 14.

The turning frame assembly 26 has a threaded hub 58, turning frame 60, and a pivot arm 62. A tool means in the form of a single point contact cutter 64 is located on the end of the pivot arm 62. The frame assembly 26 provides a rotating means for rotating the cutter 64 around the outer surface of the pipe 14.

After the arbor assembly 24 has been secured in the pipe 14, the frame assembly 26 is mounted on the arbor shaft 30 with the cutter 64 outside of the wall of the pipe 14 and the roller 66, also located on the pivot arm 62, resting on the inside wall of the pipe 14 as illustrated in FIG. 1.

The pivot arm 62 is a frame arm that pivots on an axle 68 to allow radial movement of the roller 66 as required to rest on the inside wall of the pipe 14 even if the pivot arm 62 is not located on the frame 60 to exactly align the pivot arm slot 69 with the inner wall of the pipe 14. The pivot axle 68 has an axis perpendicular to the arbor shaft 30 which lies along the axis of the frame 60. The pivot arm base 70 may be infinitely adjusted in and out along the frame 60 to fit different sizes of pipes by loosening and tightening the bolts 72 and 74 against the frame 60. The pivot arm 62 also allows the pipe lathe 12 to operate properly when the arbor shaft 30 is not located in the exact center of the pipe 14; when the pipe 14 flexes as the finger assemblies 32, 34, and 36 press against the pipe 14 or for other reasons; or when the pipe 14 is not perfectly round.

The depth of any cut is determined by the distance between the roller 66 and the cutter 64 and not by the relationship between the cutter 64 and the arbor shaft 30 as would be the case with traditional lathes used to machine fiber glass.

The frame assembly 26 includes a power drive adaptor 76. The power drive 20 is mounted onto the power drive adapter 76. Alternatively, a hand powered ratchet may be located at the same position as the power drive adapter 76.

The longitudinal screw feed assembly 28 is slipped onto the arbor shaft 30 and over the threaded hub 58 and the locking pin 78 is inserted into the locking pin hole 42 in the arbor shaft 30 to couple the screw feed assembly 28 to the arbor shaft 30. The screw feed assembly 28 operates with the threaded hub 58 to longitudinally advance the frame assembly 26 along the arbor shaft 30. The threaded hub 58 is a pipe or hollow shaft and the arbor shaft 30 fits through the middle. The screw feed assembly 28 has a screw feed sleeve 80 with a threaded surface 82, a collet nut 84 with internal threads (not shown) that engage the threaded surface 82 of the screw feed sleeve 80, two threaded collet jaws 86 and 88 and an internal spring 90. The inside of the front end 92 of the collet nut 84 is an unthreaded cone 94 with the smallest diameter nearest the front end 92. The collet jaws 86 and 88 have outer tapered surfaces 96 and 98, respectively, that match the taper of the cone 94. The collet jaws 86 and 88 are held in place against the cone 94 by the screw feed sleeve 80. The threaded jaw surfaces 100 and 102 of the jaws 86 and 88 are pressed against the threaded hub 58 by the cone 94. When the collet nut 84 is screwed onto the threaded surface 82 of the sleeve 80, an internal shoulder (not shown) of the screw feed sleeve 80 butts against the rear surfaces 106 and 108 of the collet jaws 86 and 88, respectively, forcing them toward the front end 92 of the cone 94 which gradually decreases the diameter between the threaded jaw surfaces 100 and 102 of the collet jaws 86 and 88. The collet nut 84 is rotated until the threaded jaw surfaces 100 and 102 of the collet jaws 86 and 88 engage the threads of the threaded hub 58.

When the frame assembly 26 is rotated by the power drive 20, the frame assembly 26 advances along the arbor shaft 30 by the interaction of the threaded hub 58 and the jaw surfaces 100 and 102. The direction of progression depends upon the direction of the rotation of the frame assembly 26. By this combination of the arbor shaft 30, the turning frame assembly 26, the power drive 20, and the screw feed assembly 28, a means for the automatic longitudinal progression of the cutter 64 along the pipe 14 is created. The resulting cut of the cutter 64 along the outer surface of the pipe as the automatic longitudinal progression proceeds will be a tenon cut parallel to the inner wall of the pipe 14.

Disengagement of the automatic longitudinal progression means is achieved by loosening the collet nut 84 on the screw feed sleeve 80 to allow the collet jaws 86 and 88 to be pressed off of the threaded hub 58 by the internal spring 90. The turning frame assembly 26 will then not be connected to the arbor shaft 30 and will rotate at a fixed longitudinal position allowing grooves to be made or the ends of the pipe to be cut off. In order to ensure that the frame assembly 26 does not move along the arbor shaft 30 when the longitudinal progression means is disengaged, a screw 110 (FIG. 3) tightens against the arbor shaft 30 to hold the frame assembly 26 at a fixed longitudinal position as the frame assembly 26 rotates.

Figure 3:
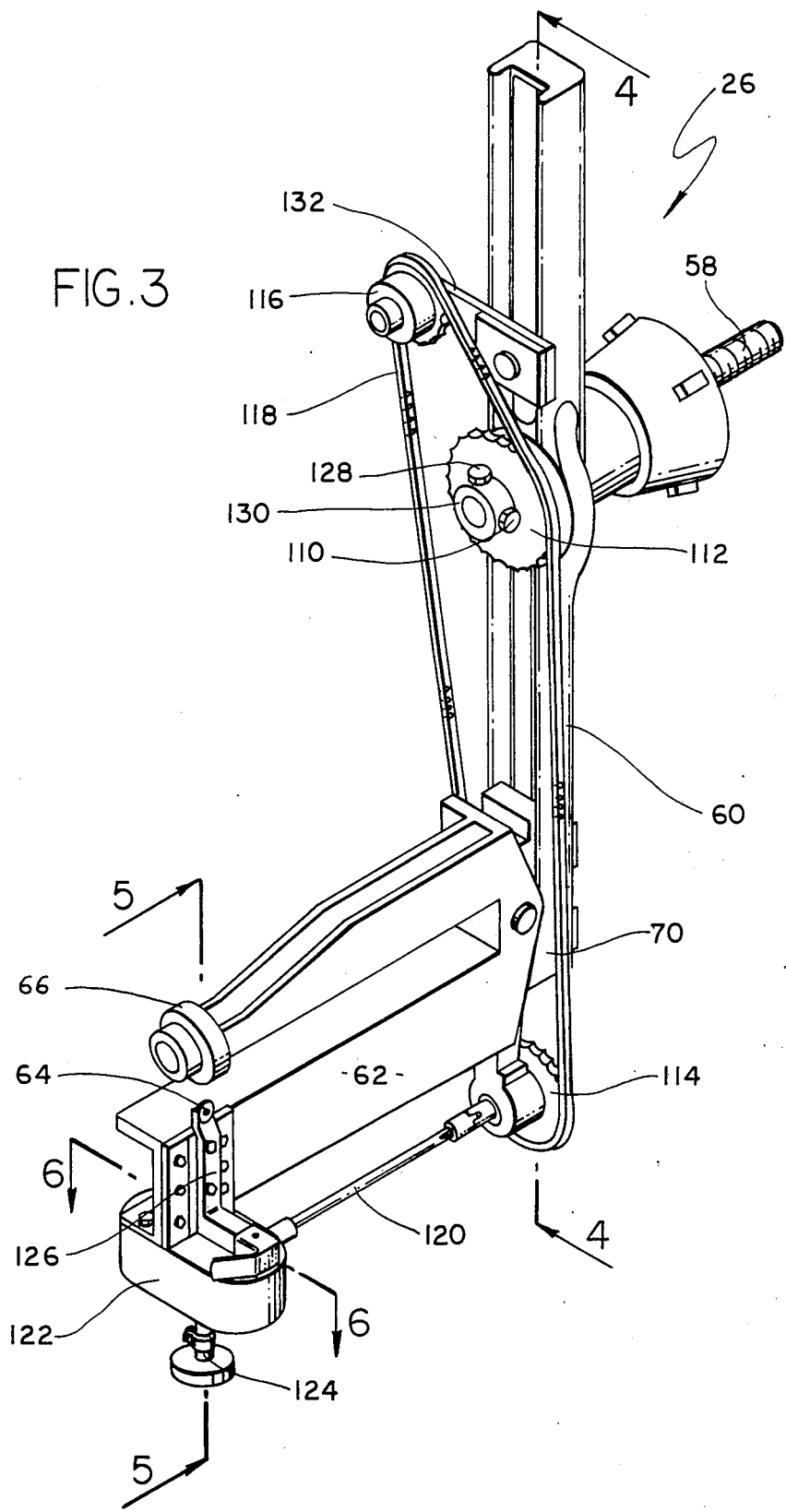
FIG. 3 is an enlarged perspective view of the frame assembly of the pipe lathe of FIG. 1.

FIG. 3 is an enlarged perspective view of the frame assembly 26 of the pipe lathe 12 of FIG. 1 illustrating the means for automatic radial progression of the cutter 64 as the frame assembly 26 is rotated. The radial progression refers to the movement of the cutter 64 towards or away from the roller 66 or the center of the pipe 14. Automatic radial progression of the cutter 64 is provided by a mechanical transmission means in the form of three sprockets 112, 114, 116, a chain 118 between the sprockets, a sliding U-joint shaft 120, a gear box 122, and a feed screw 124 operating on a tool holder means in the form of a cutter holder 126. The arbor sprocket 112 is located on the turning frame assembly 26 and does not rotate with respect to the arbor shaft 30. A set screw 128 passes through the sprocket retainer 130 and rides in the slot 44 in the arbor shaft 30 illustrated in FIG. 2. The frame sprocket 114 is rotatably mounted on the pivot arm base 70 on the frame 60. The idler sprocket 116 is rotatably mounted on a separate idler arm 132 adjustably secured to the frame 60 and is needed only to facilitate the taking up of the slack in the chain 118 when the frame sprocket 114 on the pivot arm base 70 is moved radially up or down the frame 60 to adjust the pivot arm 60 to operate on various diameters of pipe. As the turning frame assembly 26 rotates, the non-rotating arbor sprocket 112 induces rotation in the frame sprocket 114 in direct relation to the rotation of the hub 58 on the arbor shaft 30. The rotation of the frame sprocket 114 is transmitted by the sliding U-joint shaft 120 to the cutter holder 126 through suitable gearing inside the gear box 122, as described below, operating on the feed screw 124 to automatically move the cutter 64 radially.

A combination of the automatic radial progression of the cutter blade 64 provided by the chain 118, sprockets 112, 114, and 116, and gearing with the automatic longitudinal progression of the cutter 64 provided by the threaded collet jaws 86 and 88 and the threaded hub 58 illustrated in FIG. 2 produces a taper cut on the end of the pipe 14. The cutter 64 may be started either at the end of the pipe 14 progressing down the pipe or from down the pipe at the outer surface progressing toward the end. Tapers from 1° to 2° are common for fiber glass reinforced plastic pipe. Generally these tapers may be produced in a single pass of the cutter 64. An additional finishing machining pass may be made to clean away any imperfections. The precise gearing of the pipe lathe 12 and rigid structure allows the taper tolerance to be held to plus or minus 5 minutes. Tapers of 7° or more may require at least two cutting passes because of the amount of material to be removed.

The cutter 64 is a round carbide blade mounted on a small axle that allows the cutter 64 to be loosened and rotated to a sharper portion when dull.

As noted above in conjunction with the discussion of FIG. 2, the automatic longitudinal progression may be disengaged by loosening the collet nut 84 to release the collet jaws 86 and 88 from the threaded hub 58 by the internal spring 90. The hub 58, the turning frame assembly 26, and the cutter 64 will then rotate at a fixed longitudinal position. In order to ensure that the frame assembly 26 does not move along the arbor shaft 30 when the longitudinal progression means is disengaged, the screw 110 passes through the sprocket retainer 130 and tightens against the arbor shaft 30 to hold the frame assembly 26 at a fixed longitudinal position as the frame assembly 26 rotates. Combination of this feature with a continued automatic radial progression of the cutter 64 toward the center of the pipe results in the cutter 64 cutting a groove or completely cutting off the end of the pipe, depending upon how long the radial progression continues. The cut off capability allows the pipe lathe 12 to be utilized to cut pipes to insure an end cut perpendicular to the pipe axis. The grooving capability allows an O-ring or restraining cable to be inserted into the groove and connections made to O-ring or thrust resistant types of fittings.

Figure 4:
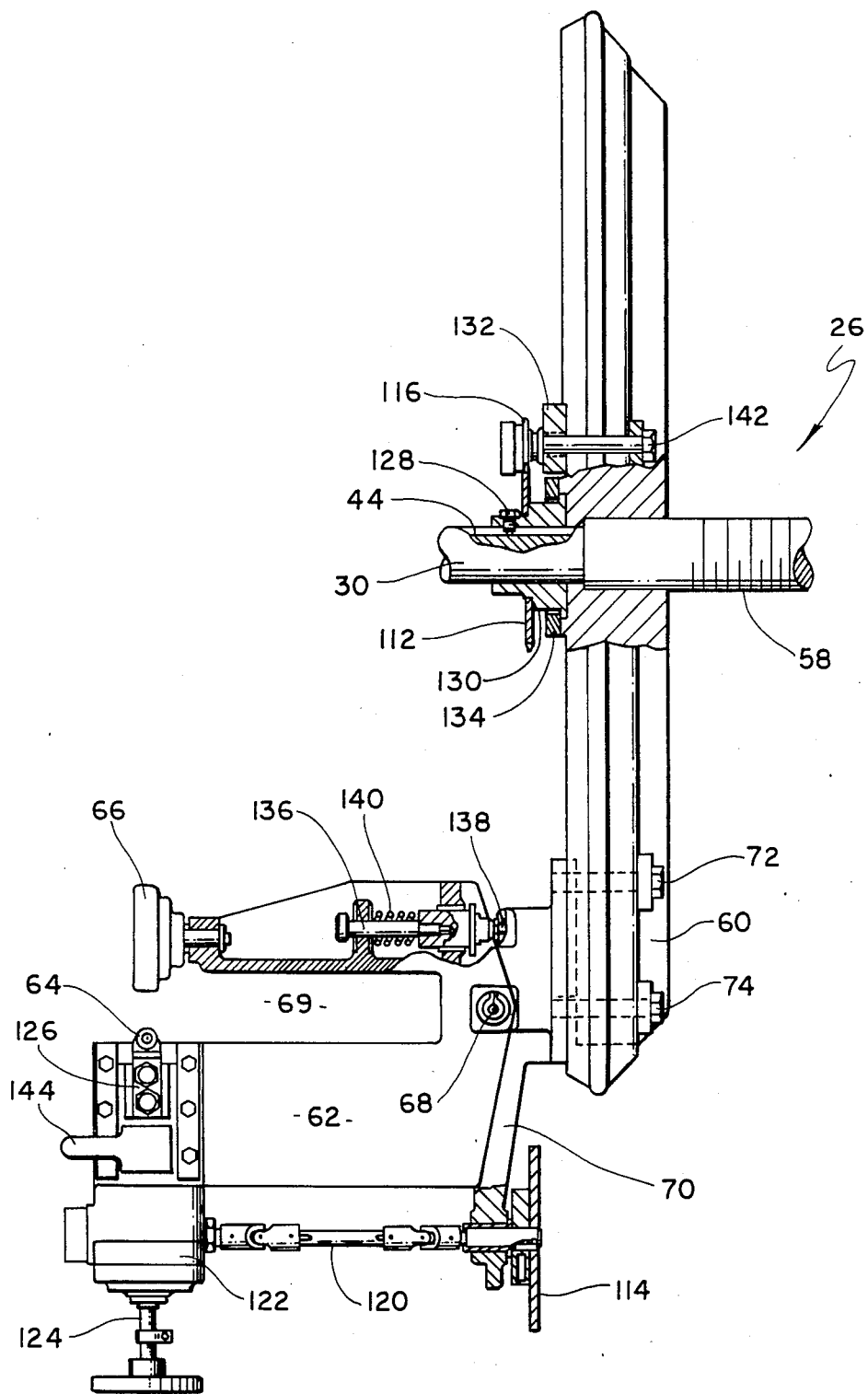
FIG. 4 is a partial sectional view along the line 4—4 of FIG. 3.

FIG. 4 is a partial sectional view along the line 4—4 of FIG. 3 with a portion of the arbor shaft 30 shown to illustrate the operation of the set screw 128 through the sprocket retainer 130 into the slot 44 to prevent rotation of the arbor sprocket 112. The sprocket retainer 130 is slidable mounted on the arbor shaft 30 and rotatably mounted on the frame assembly 26. A collar 134 on the frame assembly 26 maintains the sprocket retainer 130 against the frame assembly 26. As the frame assembly 26 is screwed along the arbor shaft 30 during the operation of the automatic longitudinal progression, the entire frame assembly 26 moves along the arbor shaft 30 and the set screw 128 slides along the slot 44. Longitudinal movement of the arbor sprocket 112 with the frame assembly 26 along the arbor shaft 30 is necessary in order to maintain the relative position between the arbor sprocket 112 and the frame sprocket 114 to prevent binding of the chain 118 shown in FIG. 3.

FIG. 4 also illustrates the operation of the pivot arm 62 around the pivot axle 68 and with respect to the pivot arm base 70. A plunger 136 is biased against an anvil 138 on the pivot arm base 70 by a spiral compression spring 140 tending to rotate the pivot arm 62 counterclockwise around the axle 68. The roller 66 is thereby continuously urged against the inside wall of the pipe 14 even when the pivot axle 68 and slot 69 are not exactly aligned with the wall of the pipe by the location of the arbor shaft 30 in the pipe 14 or by the setting of the base 70 on the frame 60. Also, the spring 140 maintains the roller 66 against the inner wall of the pipe 14 throughout a rotation of the roller 66 around the pipe 14 when the pipe 14 is not circular.

The pivot arm base 70 is a rigid structure secured to the frame 60 by the bolts 72 and 74. The location of the base 70 may be moved radially up and down on the frame to fit different sizes of pipes by loosening the bolts 72 and 74, moving the base 70, and then tightening the bolts 72 and 74. The idler sprocket 116 and the idler arm 132 carrying the sprocket must then be moved to retain the proper tensioning of the chain 118 illustrated in FIG. 3. The idler arm 132 is moved by loosening the bolt 142, moving the idler arm 132 as required, and then tightening the bolt 142. The arbor sprocket 112, of course, always remains in the same position on the frame assembly 26 although it does rotate with respect to the frame assembly 26. The frame sprocket 114 is located on the pivot arm base 70 instead of the pivot arm 62 in order to always maintain the proper spatial relationship between the sprockets 112, 114, and 116 once they are set. If the sprocket 114 were placed on the pivot arm 62, the relationship would change as the pivot arm 62 rotated. The sliding U-joint shaft 120 is provided between the frame sprocket 114 and the gear box 122 to continuously transmit the rotational force of the sprocket 114 to the gear box 122 while allowing for the possible movement of the pivot arm 62 up or down during operation.

While a chain and sprocket drive system is illustrated between the arbor shaft 30 and the gear box 122, it will be appreciated that other forms of mechanical transmission may be utilized including replacement of the arbor sprocket 112 and the frame sprocket 114 by worm gears with appropriate worm gears and a solid rotating shaft between. One of the advantages of the sprocket system, however, is that the sprockets may be readily changed to allow for different gearing combinations to provide different radial progression rates.

The rotation of the shaft 120 is translated into the radial progression of the cutter 64 by a worm 148 on the end of the shaft 120 inside the gear box 122 which turns a worm gear 150 rotating around the feed screw 124 as is illustrated and described in connection with FIG. 5 below. By this arrangement, rotation of the shaft 120 screws the feed screw 124 toward or away from the roller 66 depending upon the direction of the rotation of the shaft 120. This in turn pushes or pulls the slidable cutter holder 126 and the cutter 64 toward or away from the roller 66.

Figure 5:
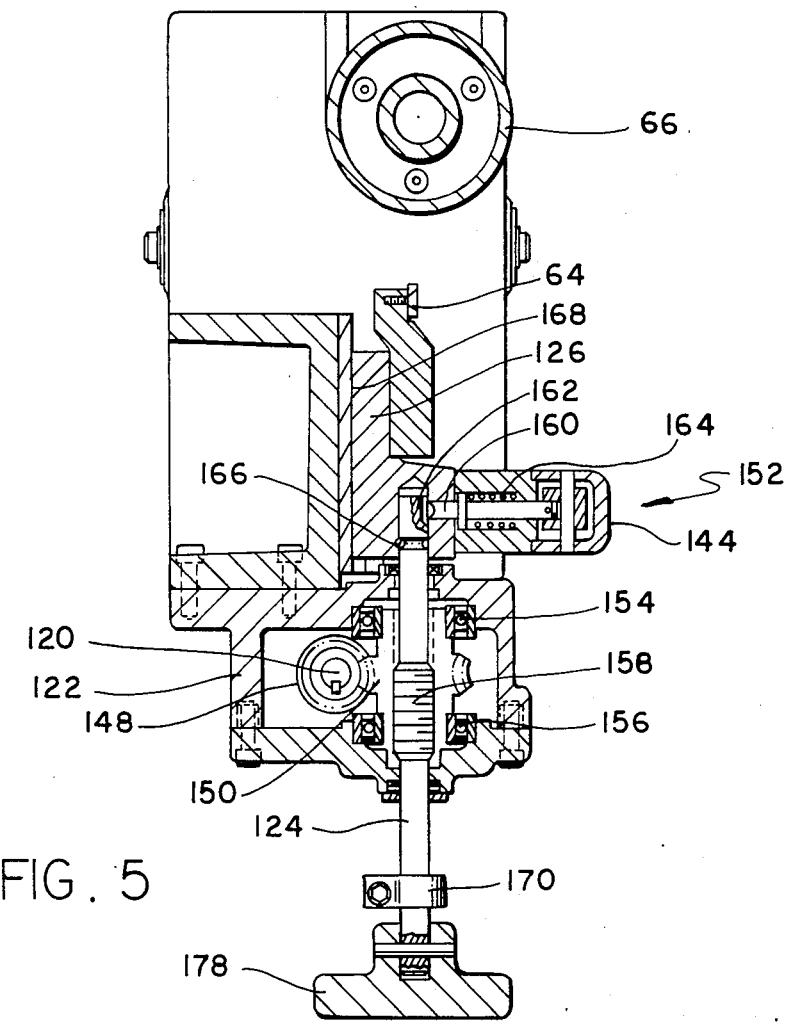
FIG. 5 is an enlarged sectional view along the line 5—5 of FIG. 3.

FIG. 5 is an enlarged sectional view along the line 5—5 of FIG. 3 showing the operation and interaction of the driver worm 148, the feed screw worm gear 150, the feed screw 124, the clutch 152, the clutch lever 144, the cutter holder 126, the cutter 64, and the roller 66. An end view of the driver worm 148 operated by the shaft 120 is shown. The driver worm 148 moves either clockwise or counterclockwise as rotated by the shaft 120. The worm 148 in turn operates the feed screw worm gear 150 which rotates in two bearings 154 and 156. The bore of the feed screw worm gear 150 is spiral threaded as is a portion 158 of the outer surface of the feed screw 124. In order for the threads between the gear 150 and the feed screw 124 to operate to move the cutter holder 126 up or down, the feed screw 124 must be held to keep it from rotating with the worm gear 150.

Figure 6:
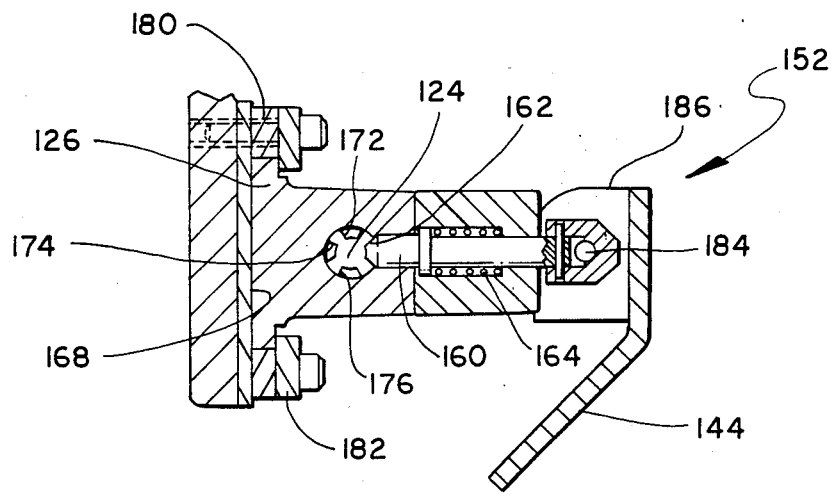
FIG. 6 is an enlarged sectional view along the line 6—6 of FIG. 3.

Rotation of the feed screw 124 is prevented by the clutch 152 acting through a clutch plunger 160 on a V-shaped surface 162 at the end of the feed screw 124. A clutch spring 164 biases the clutch plunger 160 against the V-shaped surface 162. An end view of the V-shaped surface 162 is shown in FIG. 6. Once the rotation of the feed screw 124 is stopped, the rotation of the thread in the bore of the feed screw worm gear 150 rotates with respect to the spiral threaded portion 158 of the feed screw 124 to push the feed screw 124 toward or away from the roller 66 depending upon the direction of rotation. The cutter holder 126 through a retainer ring 166 is pushed or pulled along the cutter holder track 168.

If the forces preventing the radial movement of the cutter 64 exceed a preset level determined by the strength of the clutch spring 164, the feed screw 124 eventually rotates forcing the clutch plunger 160 off the V-shaped surface 162 toward the spring 164 causing the clutch to move out of the engaged position. Besides being a safety feature, this operation of the clutch 152 may be utilized to automatically limit the depth of a cut to a preset level. The limit collar 170 is positioned on the feed screw 124 at the desired final cut level. When the feed screw 124 reaches this level, the limit collar 170 butts against the end of the gear box 122 stopping the progression of the feed screw 124 toward the roller 66.

Movement of the clutch lever 144 to compress the clutch spring 164 and pull the clutch plunger 160 off of the V-shaped surface 162 and out of engagement may be performed manually and deliberately in order to disengage the automatic radial progression feature of the pipe lathe 12. The cutter 64 will then remain in a stationary radial position with relation to the roller 66 and the resulting cut will be performed solely as a function of the automatic longitudinal progression feature of the pipe lathe 12 as was described above in conjunction with FIG. 2. As noted above, the cut will be a straight tenon having no taper.

FIG. 6 is an enlarged sectional view along the line 6—6 of FIG. 3 illustrating the operation of the clutch 152. The end of the feed screw 124 is shown to have three V-shaped surfaces 172, 174, and 176 in addition to the previously describe V-shaped surface 162. The additional surfaces allow the feed screw 124 to be preset by rotation of the feed screw handle 178 illustrated in FIG. 5 every quarter of one rotation instead of a complete rotation which would be the case if only one V-shaped surface were present. The clutch plunger 160 works equally well in any of the V-shaped surfaces 162, 172, 174, and 176. When the clutch 152 is in engagement, the cutter holder 126 moves along the cutter holder track 168 where the holder 126 is retained by the gibs 180 and 182.

When the clutch 152 is overloaded or reaches a limit imposed by the limit collar 170 described in conjunction with FIG. 5, the feed screw 124 rotates forcing the clutch plunger 160 along the V-shaped surface 162 and into the spring 164 causing the clutch 152 to move out of engagement. The clutch lever 144 may also be rotated counterclockwise about the clutch lever axle 184 until the clutch lever face 186 is reached to disengage the automatic radial progression feature.

It will be appreciated that while the embodiment illustrated is designed to perform work on the outer surface of a pipe from an end, other embodiments within the course and scope of the present invention may be fabricated to perform work on the inner surface of a pipe from the end; to perform work on the outer surface of the pipe with all of the embodiment located on the outer surface; and to perform work on the inner surface of the pipe with all of the embodiment located inside the pipe.

In view of the above description, it may be seen that a pipe lathe is shown having automatic radial progression means on the cutter blade as well as automatic longitudinal progression means. Of course, the lathe may be variously implemented and variously used depending upon specific applications. Accordingly, the scope hereof shall not be referenced to the disclosed embodiment, but on the contrary, shall be determined in accordance with the claims as set forth below.

What is claimed is:

1. A device for shaping the surface of a pipe, comprising:

mounting means for mounting said device to said pipe including a means for engaging and retaining said mounting means in a fixed position to said pipe and a means for actuating said engaging and retaining means to engage said pipe, said mounting means further including an arbor shaft substantially coaxially positioned within and extending outward from said pipe;

rotating means which is rotatable about said mounting means arbor shaft, said rotating means comprising a hub means rotatably mounted about said arbor shaft to which a frame means is coupled;

tool means for shaping the surface of said pipe, said tool means including a pivot base means coupled to said frame means, said tool means further including a pivot arm rotatably mounted to said pivot base means about an axis perpendicualr to said arbor shaft and having said first means for engaging a first pipe surface and a second means for engaging a second opposite pipe surface, said pivot arm means second engaging means including a cutting means having a surface which when brought into contact with said pipe surface will remove said pipe surface at said contacted area as said rotating means rotates about said arbor shaft;

radial progression means for moving said cutting means along a line perpendicular to said arbor shaft as said rotating means rotates about said arbor shaft; and biasing means for biasing said tool means pivot arm first engaging means into contact with said pipe surface as said rotating means rotates about said arbor shaft.

2. The device according to claim 1 wherein said tool means cutting means surface comprises a single point contact cutter.

3. The device according to claim 1 wherein said radial progression means comprises a first mechanical transmission means which engages and moves said cutting means along said perpendicular line and a second mechanical transmission means for transmitting the rotational movement of said rotating means to said first mechanical transmission means to cause said moving of said cutting means as said rotating means rotates about said arbor shaft.

4. The device according to claim 3 wherein said first mechanical transmission means comprises:

an arbor shaft sprocket attached to said frame means which rotates with said rotating means;

a frame sprocket rotatably secured to said frame means;

a chain positioned about said sprockets for transmitting the rotational movement of said arbor sprocket to said frame sprocket; and an axle having a first end connected to and rotatable with said frame sprocket and a second end connected to said second mechanical transmission means, said axle transmitting said rotational movement of said first mechanical transmission means to said second mechanical transmission means which comprises a gear box assembly interactive with said cutting means to transmit said rotational movement to and causing said cutting means to move along said perpendicular line as said rotational means rotates about said arbor shaft.

5. The device according to claim 4 wherein the first engaging means of said pivot arm includes a rotatably mounted roller which engages and is rotated across the surface of said pipe as said rotating means rotates about said arbor shaft.

6. A device for shaping a surface of a pipe comprising:

mounting means for mounting said device to said pipe, said mounting means including a means for engaging and retaining said mounting means in a fixed position to said pipe and means for actuating said engaging and retaining means to engage said pipe, said mounting means further including an arbor shaft substantially coaxially positioned within and extending outward from said pipe;

rotating means which is rotatable about said mounting means arbor shaft, said rotating means comprising a hub means rotatably mounted about said arbor shaft to which a frame means is coupled;

tool means for shaping the surface of said pipe, said tool means including a pivot base means coupled to said frame means, said tool means further including a pivot arm rotatably mounted to said pivot base means about an axis perpendicular to said arbor shaft and having a first means for engaging a first pipe surface and second means for engaging a second opposite pipe surface, said pivot arm means second engaging means including a cutting means having a surface which when brought into contact with said pipe surface will remove said pipe surface at said contacted area as said rotating means rotates about said arbor shaft;

radial progression means for moving said cutting means along a line perpendicular to said arbor shaft as said rotating means rotates about said arbor shaft;

biasing means for biasing said tool means pivot arm first engaging means into contact with said pipe surface as said rotating means rotates about said arbor shaft; and longitudinal progression means for progressing said tool means longitudinally in relation to the wall of said pipe as said rotating means rotates about said arbor shaft.

7. The device according to claim 6 wherein the first engaging means of said pivot arm includes a rotatably mounted roller which engages and is rotated across said surface of said pipe as said rotating means rotates about said arbor shaft.

8. The device according to claim 7 wherein said radial progression means comprises a first mechanical transmission means which engages and moves said cutting means along said perpendicular line and a second mechanical transmission means for transmitting the rotational movement of said rotating means to said first mechanical transmission means to cause said moving of said cutting means as said rotating means rotates about said arbor shaft.

9. The device according to claim 8 wherein said first mechanical transmission means comprises:

an arbor sprocket attached to said frame means which rotates with said rotating means;

a frame sprocket rotatably secured to said frame means;

a chain positioned about said sprockets for transmitting the rotational movement of said arbor sprocket to said frame sprocket; and an axle having a first end connected to and rotatable with said second mechanical transmission means, said axle transmitting said rotational movement from said first mechanical transmission means to said second mechanical transmission means which comprises a gear box assembly interactive with said tool means cutting means to transmit said rotational movement to and causing said cutting means to move along said perpendicular line as said rotating means rotates about said arbor shaft.

10. The device according to claim 9 wherein said longitudinally progression means comprises providing said arbor shaft with a threaded surface and providing said hub means with a passageway through which said arbor shaft can pass, said hub means passageway having a threaded surface for rotatably mating with said arbor shaft threaded surface, said hub means passageway threaded surface engaging said threaded surface of said arbor shaft whereby rotation of said hub means in one direction advances said hub means along said arbor shaft surface in one longitudinal direction and rotation of said hub means in an opposite direction advances said hub means along said arbor shaft threaded surface in an opposite longitudinal direction.

11. The device according to claim 10 wherein said longitudinal progression means further comprises a means for securing said hub means at a fixed position along said arbor shaft as said rotating means is rotated.

12. The device according to claim 11 wherein said tool means cutting means surface comprises a single point contact cutter.

13. The device of claim 10 wherein said engaging and retaining means comprises at least two means attached axisymmetrically to said arbor shaft which are substantially simultaneously radially retractable and expandable towards and back away from said arbor shaft, said radially expandable-retractable means being positionable within said pipe when said radially expandable-retractable means is radially retracted, said radially expandable-retractable means including pad means which are brought into contact with said pipe surface when said radially expandable-retractable means is radially expanded outwards, said radially expandable-retractable means possessing means for being retained in said expanded position to maintain said pad means in contact with said pipe surface and retain said mounting means fixed in said pipe.

14. The device of claim 4 wherein said engaging and retaining means comprises at least two means attached axisymmetrically to said arbor shaft which are substantially simultaneously radially retractably and radially expandable towards and back away from said arbor shaft, said radially expandable-retractable means being positionable within said pipe when said radially expandable-retractable means is radially retracted, said radially expandable-retractable means including pad means which are brought into contact with said pipe surface when said radially expandable-retractable means is radially expanded, said radially expandable-retractable means possessing means for being retained in said expanded position to maintain said pad means in contact with said pipe surface and retain said mounting means fixed in said pipe.

* * * * *